United States Patent
Mitchell et al.

(10) Patent No.: US 9,911,982 B2
(45) Date of Patent: Mar. 6, 2018

(54) PFCB NANOMETER SCALE FIBERS

(71) Applicant: GM GLOBAL TECHNOLOGY OPERATIONS LLC, Detroit, MI (US)

(72) Inventors: James Mitchell, Bloomfield, NY (US); Timothy J. Fuller, Pittsford, NY (US); Lijun Zou, Rochester, NY (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 181 days.

(21) Appl. No.: 14/885,446

(22) Filed: Oct. 16, 2015

(65) Prior Publication Data
US 2016/0043407 A1    Feb. 11, 2016

Related U.S. Application Data

(62) Division of application No. 13/659,197, filed on Oct. 24, 2012, now Pat. No. 9,163,337.

(51) Int. Cl.
| | |
|---|---|
| *H01M 4/90* | (2006.01) |
| *H01M 8/02* | (2016.01) |
| *H01M 4/86* | (2006.01) |
| *D01F 6/66* | (2006.01) |
| *H01M 2/16* | (2006.01) |
| *H01M 4/92* | (2006.01) |
| *H01M 8/0239* | (2016.01) |
| *H01M 8/0258* | (2016.01) |
| *H01M 8/1018* | (2016.01) |

(52) U.S. Cl.
CPC .......... *H01M 4/9075* (2013.01); *D01F 6/66* (2013.01); *H01M 2/162* (2013.01); *H01M 4/8673* (2013.01); *H01M 4/9058* (2013.01); *H01M 4/925* (2013.01); *H01M 8/0239* (2013.01); *H01M 8/0258* (2013.01); *H01M 2008/1095* (2013.01); *Y02E 60/50* (2013.01); *Y02E 60/522* (2013.01); *Y02P 70/56* (2015.11)

(58) Field of Classification Search
CPC .. H01M 2/162; H01M 4/8673; H01M 4/9058; H01M 4/9075; H01M 4/925; H01M 8/0239; H01M 8/0258
See application file for complete search history.

(56) References Cited

U.S. PATENT DOCUMENTS

| | | |
|---|---|---|
| 5,164,132 A | 11/1992 | Robeson et al. |
| 5,227,101 A | 7/1993 | Mahoney et al. |

(Continued)

FOREIGN PATENT DOCUMENTS

| | | |
|---|---|---|
| CN | 102130340 A | 7/2011 |
| CN | 102452173 A | 5/2012 |
| JP | 2003077494 A | 3/2003 |

*Primary Examiner* — Miriam Stagg
*Assistant Examiner* — Victoria Lynch

(57) ABSTRACT

A method for making a fibrous layer for fuel cell applications includes a step of combining a perfluorocyclobutyl-containing resin with a water soluble carrier resin to form a resinous mixture. The resinous mixture is then shaped to form a shaped resinous mixture. The shaped resinous mixture includes perfluorocyclobutyl-containing structures within the carrier resin. The shaped resinous mixture is contacted (i.e., washed) with water to separate the perfluorocyclobutyl-containing structures from the carrier resin. Optional protogenic groups and then a catalyst are added to the perfluorocyclobutyl-containing structures.

8 Claims, 4 Drawing Sheets

(56) References Cited

U.S. PATENT DOCUMENTS

| | | |
|---|---|---|
| 5,246,647 A | 9/1993 | Beck et al. |
| 5,620,807 A | 4/1997 | Mussell et al. |
| 6,559,237 B1 | 5/2003 | Mao et al. |
| 6,702,965 B2 | 3/2004 | Penneau et al. |
| 7,037,614 B1 | 5/2006 | Cooray et al. |
| 7,888,433 B2 | 2/2011 | Fuller et al. |
| 7,897,691 B2 | 3/2011 | MacKinnon et al. |
| 7,897,692 B2 | 3/2011 | MacKinnon et al. |
| 7,897,693 B2 | 3/2011 | MacKinnon et al. |
| 7,972,732 B2 | 7/2011 | MacKinnon et al. |
| 8,053,530 B2 | 11/2011 | Fuller et al. |
| 2007/0099054 A1 | 5/2007 | Fuller et al. |
| 2010/0096769 A1 | 4/2010 | Terada et al. |
| 2011/0117472 A1 | 5/2011 | Koestner et al. |
| 2011/0143254 A1 | 6/2011 | Kongkanand et al. |
| 2012/0102725 A1 | 5/2012 | Fuller et al. |
| 2012/0122011 A1* | 5/2012 | Zou .................. H01M 2/1653 429/479 |

* cited by examiner

PFCB NANOMETER SCALE FIBERS

CROSS-REFERENCE TO RELATED APPLICATIONS

This application is a division of U.S. application Ser. No. 13/659,197 filed Oct. 24, 2012, the disclosure of which is hereby incorporated in its entirety by reference herein.

The present invention relates to modified perfluorocyclobutyl-containing fibers that are useful in fuel cell applications, in particular, the present invention relates to electrode reinforcement, polyelectrolyte and water vapor transfer membrane supports, diffusion media, battery separators, and filters.

BACKGROUND OF THE INVENTION

High quality porous pads are used for filtration and in a number of electronic devices such as batteries and fuel cells. In such devices, the porous pads advantageously allow gases or components dissolved in liquids to pass through. Porous pads are made of micro-fibers, nanofibers, and micro-porous films. Fibers of these dimensions are prepared by electrospinning in the case of solvent soluble polymers. However, polyolefins are difficult to form solutions without maintaining high temperatures in high-boiling solvents. Porous polyolefins are made by biaxial tension on films or sheets of these plastic polymers. Alternatively, pore formers are added to the polyolefin sheets during the fabrication process which are then extracted by solvents or removed with heat. Electrospinning can be used in the case of solvent soluble olefins which can be processed in solutions.

In proton exchange membrane type fuel cells, hydrogen is supplied to the anode as fuel, and oxygen is supplied to the cathode as the oxidant. The oxygen can either be in pure form ($O_2$) or air (a mixture of $O_2$ and $N_2$). Proton exchange membrane ("PEM") fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Typically, the ion conductive polymer membrane includes a perfluorosulfonic acid (PFSA) ionomer.

Each catalyst layer has finely divided catalyst particles (for example, platinum particles), supported on carbon particles, to promote oxidation of hydrogen at the anode, and reduction of oxygen at the cathode. Protons flow from the anode through the ion conductive polymer membrane to the cathode where they combine with oxygen to form water which is discharged from the cell.

The MEA is sandwiched between a pair of porous gas diffusion layers ("GDL"), which in turn are sandwiched between a pair of electrically conductive flow field elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cells in stacks in order to provide high levels of electrical power.

In many fuel cell applications, electrode layers are formed from ink compositions that include a precious metal and a perfluorosulfonic acid polymer (PFSA). For example, PFSA is typically added to the Pt/C catalyst ink in electrode layer fabrication of proton exchange membrane fuel cells to provide proton conduction to the dispersed Pt nanoparticle catalyst as well as binding of the porous carbon network. Traditional fuel cell catalysts combine carbon black with platinum deposits on the surface of the carbon, along with ionomers. The carbon black provides (in part) a high surface area conductive substrate. The platinum deposits provide a catalytic behavior, and the ionomers provide a proton conductive component. The electrode is formed from an ink that contains the carbon black catalyst and the ionomer, which combine on drying to form an electrode layer. Gas diffusion layers have a multidimensional role in fuel cell technology. For example, gas diffusion layers act as diffusers for reactant gases traveling to the anode and the cathode layers while transporting product water to the flow field. Gas diffusion layers also conduct electrons and transfer heat generated at the membrane electrode assembly to the coolant, and act as a buffer layer between the soft membrane electrode assembly and the stiff bipolar plates.

Although the present technologies for making electrode inks for fuel cell applications work reasonably well, there are still concerns that need to be addressed. For example, the catalyst layers that are formed from such inks tend to be mechanically fragile. To remedy this characteristic, reinforcement with fibers is typically used. Such reinforcing fibers tend to be expensive needing to be produced with optimized physical characteristics.

Accordingly, the present invention provides improved methods for the preparation of catalyst layers from inks that are useful in fuel cell applications.

SUMMARY OF THE INVENTION

The present invention solves one or more problems of the prior art by providing in at least one embodiment a method of making a fibrous layer for fuel cell applications. The method includes a step combining a perfluorocyclobutyl-containing resin with a water soluble carrier resin to form a resinous mixture. The resinous mixture is then extruded to form a shaped resinous mixture. The shaped resinous mixture includes perfluorocyclobutyl-containing structures within the carrier resin. The shaped resinous mixture is contacted (i.e., washed) with water to separate the perfluorocyclobutyl-containing structures from the carrier resin. Optional protogenic groups and then a catalyst are added to the perfluorocyclobutyl-containing.

In another embodiment, a method of making a fibrous sheet for fuel cell applications is provided. The method includes a step of combining a perfluorocyclobutyl-containing resin with a water soluble carrier resin to form a resinous mixture. The resinous mixture is extruded to form an extruded resinous mixture. The extruded resinous mixture includes perfluorocyclobutyl-containing fibers disposed within the carrier resin. The extruded resinous mixture is contacted with water to separate the perfluorocyclobutyl-containing fibers from the carrier resin. The perfluorocyclobutyl-containing fibers are then optionally sulfonated to form sulfonated perfluorocyclobutyl-containing fibers. At least a portion of the perfluorocyclobutyl-containing fibers are coated with a catalyst. The sulfonated perfluorocyclobutyl-containing fibers are then formed into a fuel cell electrode layer.

In still another embodiment, a fuel cell including perfluorocyclobutyl-containing fibers is provided. The fuel cell includes a first flow field plate and a second flow field plate. A first catalyst-containing electrode layer and second catalyst-containing electrode layer is interposed between the first flow field plate and the second flow field plate. An ion-conducting layer is interposed between the first catalyst layer and the second catalyst layer. Characteristically, at least one of the first catalyst-containing electrode layer and the second catalyst-containing electrode layer includes sulfonated perfluorocyclobutyl-containing fibers which include catalyst.

The nanometer scale sulfonated perfluorocyclobutyl fibers of various embodiments can be modified to have ionomeric behavior, catalytic behavior, and electrically conductive properties. These modifications provide part or all of the properties of traditional carbon black-platinum fuel cell catalysts, into a single component. The outer dimension of the fibers is also in the range of the outer dimension of carbon black particles used in carbon black-platinum fuel cell catalysts, creating surface areas similar in range to the functional surface of the carbon black catalysts.

BRIEF DESCRIPTION OF THE DRAWINGS

Exemplary embodiments of the present invention will become more fully understood from the detailed description and the accompanying drawings, wherein.

DESCRIPTION OF THE INVENTION

Figure 1:
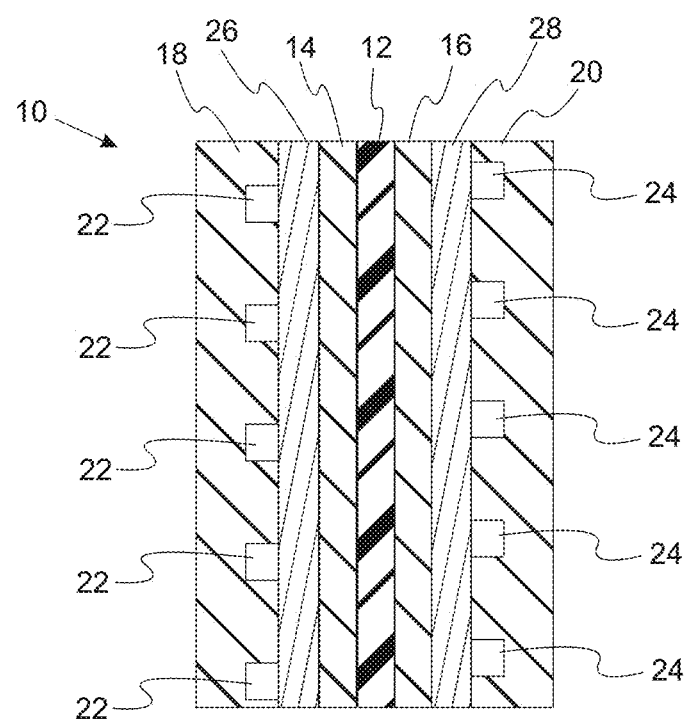
FIG. 1 provides a schematic illustration of a fuel cell incorporating perfluorocyclobutyl-containing fibers in the membrane or in at least one of the electrodes.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refer to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

With reference to FIG. 1, a schematic cross section of a fuel cell that incorporates a catalyst or a reinforcement membrane support having perfluorcyclobutyl (PFCB)-containing fibers is provided. Proton exchange membrane (PEM) fuel cell 10 includes polymeric ion conducting membrane 12 disposed between cathode catalyst layer 14 and anode catalyst layer 16. Fuel cell 10 also includes flow field plates 18, 20, gas channels 22 and 24, and gas diffusion layers 26 and 28. Advantageously, cathode catalyst layer 14 and/or anode catalyst layer 16 include perfluorocyclobutyl-containing structures (i.e., fibers) as set forth below. During operation of the fuel cell, a fuel such as hydrogen is fed to the flow field plate 20 on the anode side and an oxidant such as oxygen is feed flow field plate 18 on the cathode side. Hydrogen ions are generated by anode catalyst layer 16 migrate through polymeric ion conducting membrane 12 were they react at cathode catalyst layer 14 to form water. This electrochemical process generates an electric current through a load connect to flow field plates 18 and 20. In another embodiment, perfluorocyclobutyl fibers are added to the polymeric ion conducting membrane or at least one of the electrode layers (i.e., cathode catalyst layer 14 and anode catalyst layer 16) for mechanical reinforcement.

Figure 2:
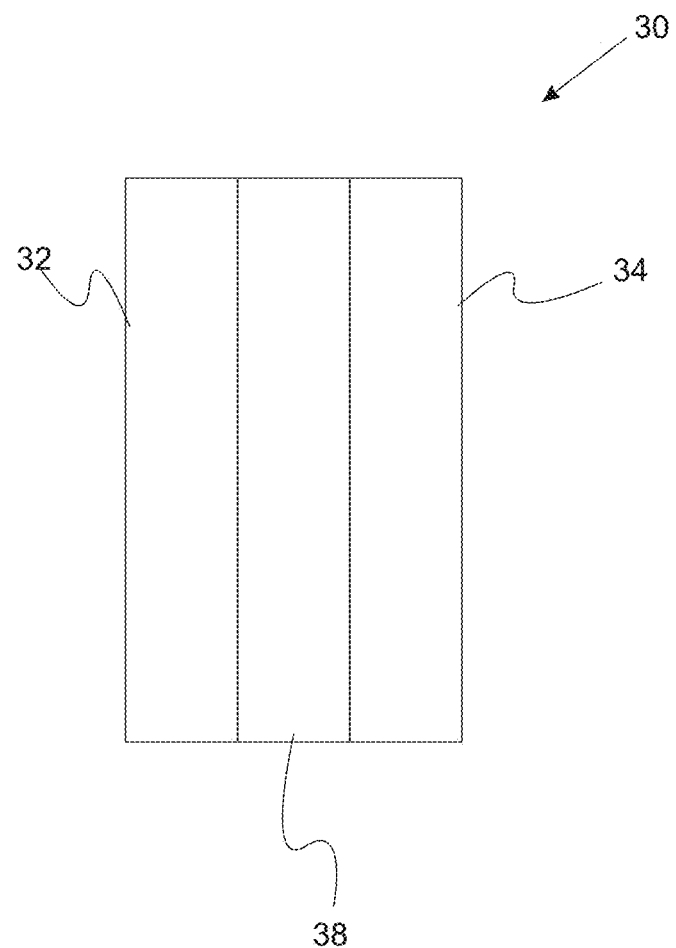
FIG. 2 provides a schematic cross section of a battery assembly incorporating PFCB-containing nanofibers.

In another embodiment, a perfluorocyclobutyl fiber mat is used to make a lithium ion battery separator. FIG. 2 provides a schematic cross section of a battery assembly incorporating PFCB-containing nanofibers. Battery 30 includes anode 32 and cathode 34. Separator 38 is interposed between anode 32 and cathode 34 thereby minimizing electrical shorts between the two electrodes while allowing passages of ions such as lithium (Li+).

In other embodiments of the present invention, perfluorocyclobutyl nanometer thick fibers are functionalized with the addition of sulfonic acid groups, producing a proton conductive fiber. These fibers can be added to an electrode layer as a reinforcing component. They offer a number of advantages over other additives. In particular, perfluorocyclobutyl polymer (fiber) is resistant to heat, acids and alkalies, bleaches, aging, sunlight, and abrasion. The fibers readily disperse into water and alcohols, and with the addition of sulfonic acid groups, are an excellent option as an electrode additive. The flexible nature of the fiber reduces concerns common with more ridged fibers. The processes of the present invention are surprisingly discovered to produce nanometer thick fibers which are modifiable with protogenic groups and, in particular, sulfonic acid groups as set forth below. In some variations, the fibers can also have fiber diameters in the micron range. In particular, fibers from about 10 to about 30 microns are produced.

Figure 3:
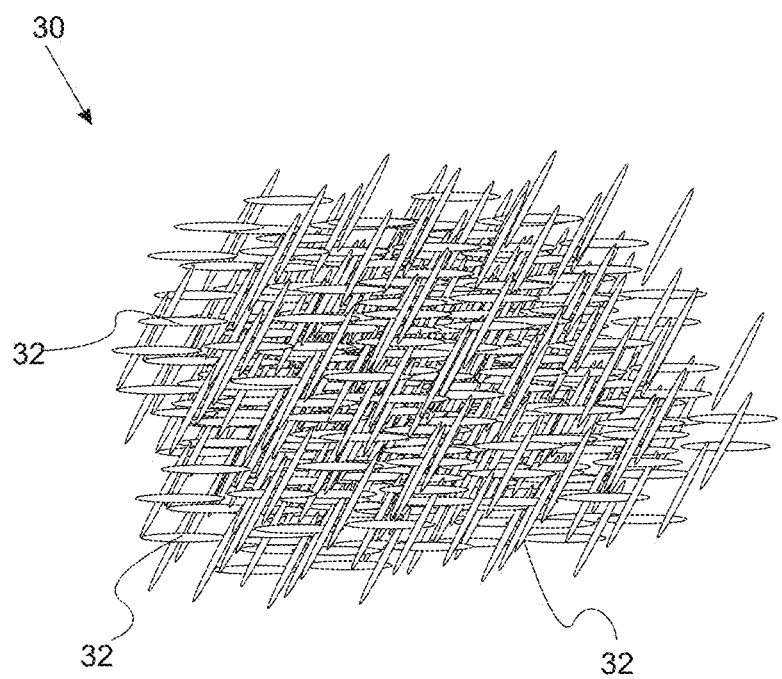
FIG. 3 is an idealized top view of a fibrous plate or pad made by a variation of the method set forth below.

With reference to FIG. 3, an idealized top view of a fibrous pad made by a variation of the method set forth below is provided. Fibrous sheet 30 is formed from a plurality of perfluorocyclobutyl fibers 32 aggregated together to form a pad-like layer. Typically, perfluorocyclobutyl fibers 32 have an average width from about 5 nanometers to about 30 microns. In another refinement, perfluorocyclobutyl fibers 32 have an average width (i.e., diameter) from about 5 nanometers to about 10 microns. In still another refinement, perfluorocyclobutyl fibers 32 have an average width of from about 10 nanometers to about 5 microns. In still another refinement, perfluorocyclobutyl fibers 32 have an average width of from about 100 nanometers to about 5 microns. In still another variation, perfluorocyclobutyl fibers 32 have an average width of from about 50 nanometers to about 400 nm. In yet another refinement, fibrous sheet 30 is electrically conductive. In certain variations, perfluorocyclobutyl fibers 32 are modified with protogenic groups and/or metal layers as set forth below.

In a variation of the present embodiment, fibrous sheet 30 has a thickness from about 50 microns to about 2 mm. In a refinement, fibrous sheet 30 has a thickness from about 50 microns to about 1 mm. In another refinement, fibrous sheet 30 has a thickness from about 100 microns to about 500 mm.

In another variation, the fibrous sheet includes voids that result in porosity. In a refinement, the porosity is from about 5 to 95 volume percent. In this context, porosity means the volume percent of the sheet that is empty. In another refinement, the porosity is from about 20 to 80 volume percent. In still another refinement, the porosity is from about 40 to 60 volume percent.

Figure 4:
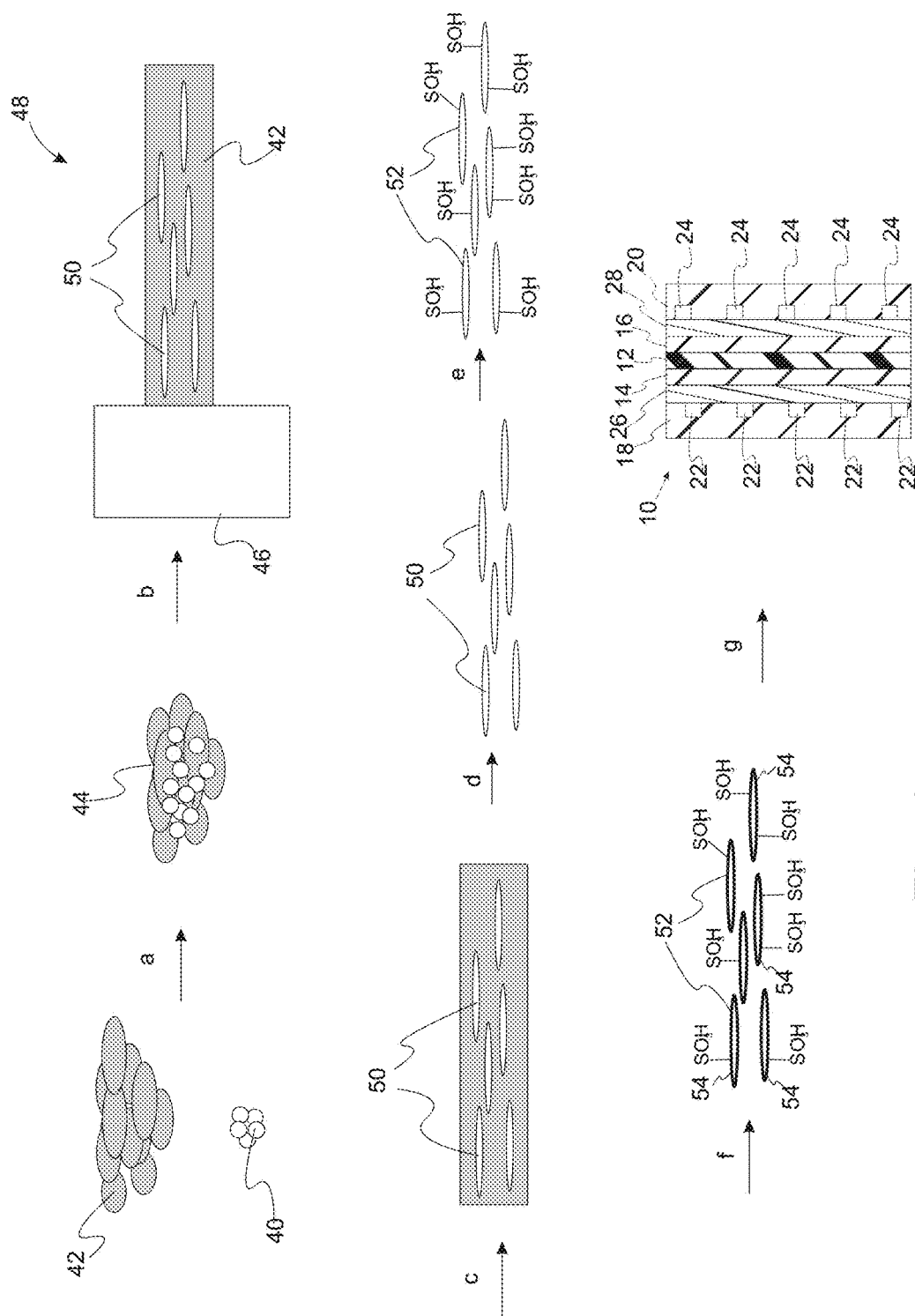
FIG. 4 is a schematic flow chart showing the fabrication of perfluorocyclobutyl-containing fibers for fuel cell applications.

With reference to FIG. 4, a schematic flow chart illustrating a method of making perfluorocyclobutyl structures useful for fuel cell applications is provided. In step a), perfluorocyclobutyl-containing resin 40 is combined with water soluble carrier resin 42 to form resinous mixture 44. In a refinement, the weight ratio of perfluorocyclobutyl-containing resin 40 to water soluble carrier resin 42 is 1:100 to about 10:1 In another refinement, the weight ratio of perfluorocyclobutyl-containing resin 40 to water soluble carrier resin 42 is 1:50 to about 10:1 In still another refinement, the weight ratio of perfluorocyclobutyl-containing resin 40 to water soluble carrier resin 42 is 1:10 to about 10:1. Examples of suitable water-soluble resins include, but are not limited to, water-soluble polyamides (e.g., poly(2-ethyl-2-oxazoline) ("PEOX"). In a refinement, the PEOX has a number average molecular weight from about 40,000 to about 600,000. Molecular weights of 200,000 and 500,000 have been found to be particularly useful. In step b), resinous mixture 44 is shaped. FIG. 4 depicts a particular example in which resinous mixture 44 is extruded. Therefore, resinous mixture 44 is extruded from extruder 46 in step b) to form extruded resinous mixture 48. Extruded resinous mixture 48 includes perfluorocyclobutyl-containing fibers 50 within carrier resin 42. In a refinement, the extrusion can be varied or replaced with a step to produce bead, spheres or oblong perfluorocyclobutyl-containing structures. The formation of beads, spheres, or oblong shapes depend on the extrusion conditions. If beads are desired, the melted extruded material (molten extrudate) should not be pulled under tension and stretched to deform the incompatible spherical domains into fibers. In step c), the extruded fiber is optionally separated from extruder 46. In step d), perfluorocyclobutyl-containing fibers 50 are freed from the fiber by contacting/washing in water. In step e), protogenic groups (PG) are optionally added to the perfluorocyclobutyl-containing fibers to form modified perfluorocyclobutyl-containing fibers 52. Examples of protogenic groups include —SO2X, —PO3H2, and —COX where X is an —OH, a halogen, or an ester and n is a number from about 20 to about 500 on average. In particular, the perfluorocyclobutyl-containing fibers are sulfonated (SO3H) in this step.

In a variation, the perfluorocyclobutyl containing fibers are at least partially coated with a metal-containing layer 54 in step f). In a refinement, metal-containing layer 54 is a catalyst-containing layer. In another refinement, metal-containing layer 54 is metal layer rendering the fibers electrically conductive. In still another refinement, metal-containing layer 54 comprises a component selected from the group consisting of gold, palladium, platinum, and combinations thereof. Suitable film coating processes for forming the metal containing layer include, but are not limited to, physical vapor deposition (PVD), plasma enhanced chemical vapor deposition (PECVD), magnetron sputtering, electron beam deposition, ion beam enhanced deposition, ion assisted deposition, chemical vapor deposition, electroplating, and the like.

In step g), perfluorocyclobutyl-containing fibers 50 or modified perfluorocyclobutyl-containing fibers 52 are formed into or incorporated into a fuel cell component, e.g., catalyst-containing electrode layers such as cathode catalyst layer 14 and/or anode catalyst layer 16. In a refinement, the catalyst-containing electrode layers are formed by pressing and heating of sulfonated perfluorocyclobutyl-containing fibers 52. In another refinement, sulfonated perfluorocyclobutyl-containing fibers 52 are bonded to paper or a mat. In another refinement, sulfonated perfluorocyclobutyl-containing fibers 52 are combined with a solvent and an optional ionomer (e.g., Nafion™-a perfluorosulfonic acid polymer). This ink composition is applied to a surface (e.g., an ion conducting layer or a gas diffusion layer) in a fuel cell component, and then dried. In this latter refinement, suitable solvents include alcohols (e.g., methanol, alcohol, propanol, and the like) and water. A combination of alcohol and water is found to be particularly useful. A typical cathode ink formulation containing 5 wt % perfluorocyclobutyl fibers is summarized in Table 1. In a refinement, the ink composition is combined with a filler such as zirconia beads. In a further refinement, about 40 grams of the ink composition is combined with from about 20 to about 80 grams of filler to form a modified ink composition. Typically, a cathode catalyst layer 14 and/or anode catalyst layer 16 formed by this method has a thickness from about 5 microns to 5 mm. For optimal performance, cathode catalyst layer 14 and/or anode catalyst layer 16 are electrically conductive.

TABLE 1

Ink Formulation

| Ingredients | Weight % |
| --- | --- |
| 30% PtCo/HSC Alloy Catalyst | 2-6 |
| H$_2$O | 8-16 |
| EtOH | 60-80 |
| IG100 (Asahi Glass, 28.62 wt % in EtOH:H2O = 60.1:39.9) | 4-15 |
| Perfluorocyclobutyl fibers | 0.1-2 |

Suitable polymers having perfluorocyclobutyl moieties are disclosed in U.S. Pat. Pub. No. 2007/0099054, U.S. Pat. No. 7,897,691 issued Mar. 1, 2011; U.S. Pat. No. 7,897,692 issued Mar. 1, 2011; U.S. Pat. No. 7,888,433 issued Feb. 15, 2011, U.S. Pat. No. 7,897,693 issued Mar. 1, 2011; and U.S. Pat. No. 8,053,530 issued Nov. 8, 2011, the entire disclosures of which are hereby incorporated by reference. Ionomeric perfluorocyclobutyl polymers do not extrude well without decomposition and so the attachment of ion conducting groups should take place after the fibers are formed. In a variation, after post fiber formation and functionalization, the ion-conducting polymer having perfluorocyclobutyl moieties includes a polymer segment comprising polymer segment 1:

$$E_0\text{-}P_1\text{-}Q_1\text{-}P_2 \qquad 1$$

wherein:

$E_0$ is a moiety, and in particular, a hydrocarbon-containing moiety, that has a protogenic group such as —SO$_2$X, —PO$_3$H$_2$, —COX, and the like;

$P_1$, $P_2$ are each independently absent, —O—, —S—, —SO—, —CO—, —SO$_2$—, —NH—, NR$_2$—, or —R$_3$—;

$R_2$ is $C_{1\text{-}25}$ alkyl, $C_{6\text{-}25}$ aryl or $C_{6\text{-}25}$ arylene;

$R_3$ is $C_{2\text{-}25}$ alkylene, $C_{2\text{-}25}$ perfluoroalkylene, $C_{2\text{-}25}$ perfluoroalkyl ether, $C_{2\text{-}25}$ alkylether, or $C_{6\text{-}25}$ arylene;

X is an —OH, a halogen, an ester, or

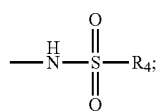

$R_4$ is trifluoromethyl, $C_{1\text{-}25}$ alkyl, $C_{2\text{-}25}$ perfluoroalkylene, or $C_{6\text{-}25}$ aryl; and $Q_1$ is a perfluorinated cyclobutyl moiety.

Examples for $Q_1$ and $Q_2$ in the above formulae are:

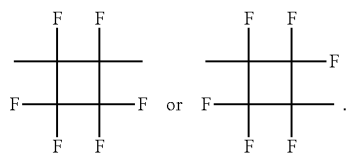

In a refinement, $E_0$ is a $C_{6\text{-}30}$ aromatic (i.e., aryl) containing group.

In a refinement of the present invention, perfluorocyclobutyl-containing resin 40 used in step a) includes a plurality of electrically conductive particles. Examples of useful electrically conductive particles include, but are not limited to, carbon particles, graphite particles, metal particles, and combinations thereof. In another refinement, perfluorocyclobutyl-containing resin 40 used in step a) further includes another thermoplastic resin. Examples of suitable thermoplastic resins include, but are not limited to, polyolefins, polyesters, and combinations thereof. Other examples include, but are not limited to, polyethylene, polypropylene, polybutene, polybutylene terephthalate, perfluorosulfonic acid polymers, perfluorocyclobutane polymers, polycycloolefins, polyperfluorocyclobutanes, polyamides (not water soluable), polylactides, acrylonitrile butadiene styrene, acrylic, ethylene-vinyl acetate, ethylene vinyl alcohol, fluoropolymers (e.g., PTFE, FEP, etc), polyacrylates, polyacrylonitrile (e.g., PAN), polyaryletherketone, polybutadiene, polybutylene, polybutyl ene terephthalate, polycaprolactone, polychlorotrifluoroethylene, polyethylene terephthalate, polycyclohexylene dimethylene terephthalate, polycarbonate, polyhydroxyalkanoates, polyketone, polyetherketone, polyetherimide, polyethersulfone, polyethylenechlorinates, polymethylpentene, polyphenylene oxide, polystyrene, polysulfone, polytrimethylene terephthalate, polyurethane, polyvinyl acetate, polyvinyl chloride, polyvinylidene chloride, styrene-acrylonitrile, and combinations thereof.

In a refinement of the present invention for the variations and embodiments set forth above, the fibers have an average cross sectional width (i.e., diameter when the fibers have a circular cross section) from about 5 nanometers to about 30 microns. In another refinement, the fibers have an average width of about 5 nanometers to about 10 microns. In still another refinement, the fibers have an average width of from about 10 nanometers to about 5 microns. In still another refinement, the fibers have an average width of from about 100 nanometers to about 5 microns. The length of the fibers typically exceeds the width. In a further refinement, the fibers produced by the process of the present embodiment have an average length from about 1 mm to about 20 mm or more.

The following examples illustrate the various embodiments of the present invention. Those skilled in the art will recognize many variations that are within the spirit of the present invention and scope of the claims.

Preparation of PFCB Nano-Fibers. Perfluorocyclobutyl polymers (PFCB) thermoplastic fibers are first created by dispersing PFCB in 500,000 MW water soluble polymer poly(2-ethyl-2-oxazoline) (PeOX). Specifically, 5 grams of PFCB is first blended in a Waring blender with 15 grams of 500,000 MW PeOX (a ratio of 1 to 3). The combined blend is added to a laboratory mixing extruder (Dynisco, LME) operated at 220° C. header and rotor temperatures with the drive motor operated at 50% of capacity, resulting in an extruded strand of the blend. This extruded strand is added to the blender to return it to granular form, and re-extruded two more times, creating a uniform extruded strand. During the final extrusion processes, the fibers are spun onto a take-up wheel (a Dynisco Take-Up System (TUS), at approximately 10 cm/second. The resulting extruded strand is repeatedly washed in water using a Waring blender, until the PeOX has been removed, resulting in a dispersion of PFCB nanofibers in water. The fibers are collected on a PTFE filter, and allowed to dry completely. Typically, the nanofibers are approximately 0.5 to 1 nm wide and more than 10 nm long. The fibers are optionally modified with sulfonic acid groups to improve proton conductivity.

Preparation of Sulfonated PFCB Nano-Fibers. The nanofibers formed by the co-extrusion process described above are dispersed in hexanes and chlorosulfonic acid (between 0.5 and 1.0 g of ClSO3H per gram of PFCB nanofibers) is added in hexanes. The mixture is roll milled for 16 hours, and then the purple fibers are heated in boiling water to remove the hexanes. After 1 hour of boiling in water, the sulfonated-PFCB nanofibers are isolated by filtration, washed with water, and then dried in a 50° C. oven.

The addition of a Metallic Layer to Create Electrically Conductive Nano-Fibers.

The fibers, are coated with a metal layer to improve electrical conductivity. Fibers are first dispersed into reverse osmosis (RO) water using a Misonix 3000 ultrasonic homogenizer for 5 minutes, set to pulse mode (10 seconds on-10 seconds off) at 18 Watts. The resulting dispersion is filtered onto a polycarbonate filter (0.45 um pore) to a thickness of approximately 2-4 um. The resulting mat is placed in a Hummer Sputtering system, and the vacuum reduced to 88 mTorr (Argon). The sample is sputtered with Gold/Palladium using 15 mAmps for 30 seconds. The process is repeated as needed with additionally filtered samples until sufficient amounts of nano-fibers have received a conductive coating. Sputtering of platinum on the perfluorocyclobutyl fibers is done similarly but with a Pt target. In general the perfluorocyclobutyl groups are used in an anode ink and in particular, a cathode ink, as an additive to form fuel cell anodes and cathodes.

Membrane Electrode Assembly Preparation Using Perfluorocyclobutyl Fibers as a Cathode Ink Reinforcement Additive. Perfluorocyclobutyl fibers is added to the cathode ink solution at 5 wt. % based on the weight of ionomer used in the electrode formulation to fabricate 0.2 mg Pt/cm$^2$ loaded cathode electrodes. These electrodes are evaluated as catalyst coated membranes (CCM) in membrane electrode assemblies (MEAs) and are tested for fuel cell performance and durability with 0.05 mg Pt/cm$^2$ loaded anode electrodes without added perfluorocyclobutyl fibers. Performance is then compared with that of MEAs made using the same cathode ink without the perfluorocyclobutyl fibers additive and using the same 0.05 mg Pt/cm$^2$ loaded anode electrodes.

The cathode ink solution is prepared on a 40 g scale and the ingredients used in the formulation are listed in Table 1 as shown below. The mixture solution is ball-milled with $ZrO_2$ beads for 3 days before coating using Meyer rods to obtain the requisite Pt surface area. MEAs are also made with the standard cathode following the formulation found in Table 2, and these cathodes and the 0.05 mg Pt/cm$^2$ loaded anode electrodes are tested for fuel cell performance and durability for a baseline comparison. The standard anode with 0.05 mg Pt/cm$^2$ is prepared from 20% Pt/Vulcan (graphite, TKK catalyst, Tanaka) and IG100 ionomer (Asahi Glass).

TABLE 1

The cathode ink formulation with 5 wt % additive of perfluorocyclobutyl fibers based on ionomer at a loading of 0.2 mg Pt/cm$^2$.

| Ingredients | Mass (g) |
| --- | --- |
| 30% PtCo/HSC Alloy Catalyst | 1.74 |
| $ZrO_2$ Beads (5 mm) | 50.00 |
| $H_2O$ | 5.05 |

TABLE 1-continued

The cathode ink formulation with 5 wt % additive of perfluorocyclobutyl fibers based on ionomer at a loading of 0.2 mg Pt/cm$^2$.

| Ingredients | Mass (g) |
| --- | --- |
| EtOH | 29.37 |
| IG100 (Asahi Glass, 28.62 wt % in EtOH:H2O = 60.1:39.9) | 3.78 |
| Perfluorocyclobutyl fibers | 0.06 |
| Ink Total | 40.00 |

TABLE 2

The standard cathode ink formulation at a loading of 0.2 mg Pt/cm$^2$.

| Ingredients | Mass (g) |
| --- | --- |
| 30% PtCo/HSC Alloy Catalyst | 1.74 |
| $ZrO_2$ Beads (5 mm) | 50.00 |
| $H_2O$ | 4.99 |
| EtOH | 29.29 |
| IG100 (28.62 wt % in EtOH:H2O = 60.1:39.9) | 3.98 |
| Ink Total | 40.00 |

The weight-ratio of ionomer to carbon (I/C ratio) is fixed at 0.95 for the cathode and at 0.6 for the anode to ensure good coating quality. Electrode inks are coated using a Meyer rod onto ethylene-tetrafluoroethylene (ETFE) substrate. The coated catalyst layers are then decal transferred to the polyelectrolyte membrane by hot pressing. The die-cut cathode- and anode-coated decals with an active area of 50 cm$^2$ were hot pressed onto Nafion® 211 (25 μm, 1100 EW) membranes at 295° F. for 2 min at 0 lbs and 2 min at 5000 lbs. The 50 cm$^2$ CCM is then assembled into a fuel cell with carbon paper having a proprietary microporous layer on a carbon fiber gas diffusion media (GDM, Mitsubishi Rayon Corp.). Single fuel cells are then assembled with hardware having "dog-bone" flow-fields and are tested.

Preparation of Brominated Perfluorocyclobutyl Fibers. The solubility of perfluorocyclobutyl polymers in methylene chloride precluded bromination after fiber formation. Therefore, perfluorocyclobutyl polymers are first brominated and then processed into fibers. The bromination of the PFCB polymers is performed as follows. A perfluorocyclobutane (TRJ3058) multi-block co-polymer available from Tetramer Technologies, LLC with the structure shown below consists of a 2 to 1 molar ratio of biphenyl to hexafluoroisopropylidene biphenyl moieties. The overall number average molecular weight of the polymer by size exclusion chromatography is 60,000, while that of the biphenyl chains is about 8,000. The hexafluoroisopropylidene biphenyl groups are interspersed between the 8000 molecular weight biphenyl segments in a less defined way, because these are introduced individually during the polymerization instead of being added as an oligomer segment. The polydispersity of the polymer, defined as weight average molecular weight divided by number average molecular weight, is 1.3. The polymer is soluble in alcohols (methanol, ethanol, 1-propanol and isopropanol) and in polar aprotic solvents such as N,N-dimethylacetamide, N,N-dimethylformamide, and N-methylpyrrolidone. Polymers with this structure are further described in U.S. Pat. Nos. 7,897,691; 7,960,046; 7897,691; and 8,053,530.

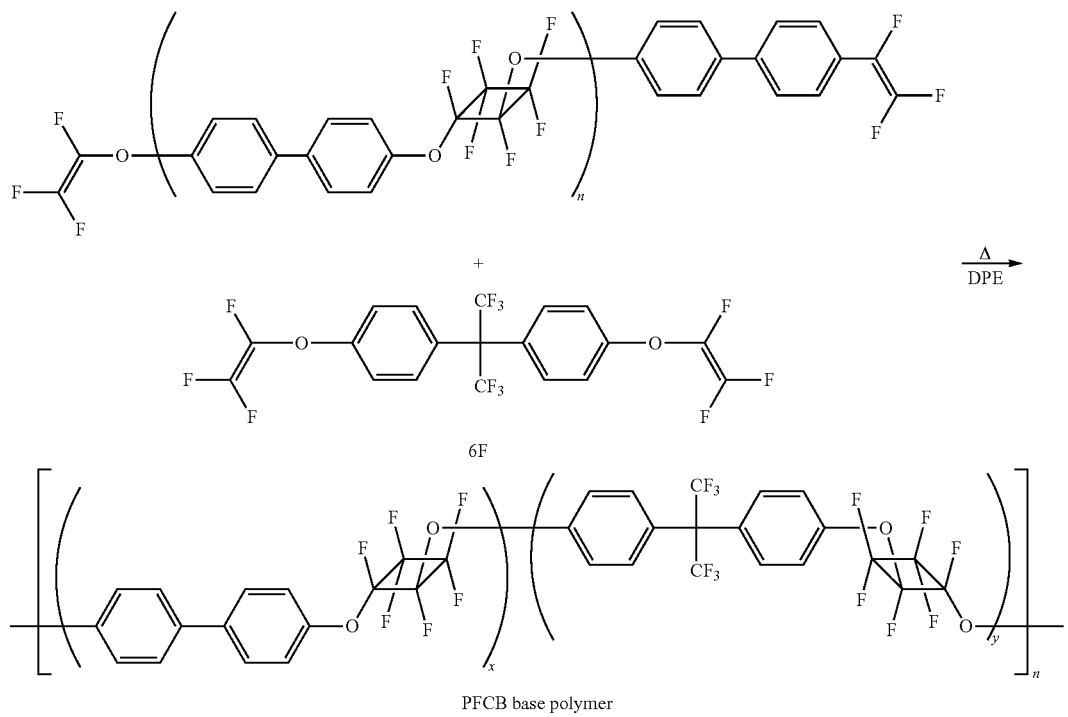

PFCB base polymer

In this structure, molecular weights are typically between 50,000 and 150,000 (meaning n varies between 2 and 50 with about 5 being typical; x ranges between 5 and 60 with about 20 to 25 being preferred; and y is about ½ of x, i.e., y is between 2 and 30 with about 10 to 15 being preferred.

The PFCB base polymer (TRJ3058, 5 g) in methylene chloride (100 mL) is placed in a screw-cap jar with magnetic stirring overnight. Iron powder (0.27 g, Sigma-Aldrich, <10 micro, catalog number 267953) is added with vigorous stirring to disperse the iron off of the stir bar (and the mixture becomes gray). Bromine (e.g., 3.4 g) is added and the reaction mixture is stirred. Then 100-mL of 10 wt. % sodium bisulfite solution is added and the mixture is stirred until the reaction mixture becomes colorless. A separatory funnel is used to remove the aqueous layer, and the methylene chloride layer is washed 3 times in a separatory funnel with water (100-mL each wash). The methylene chloride layer was pressure filtered through a 5-micron Mitex (ePTFE) filter. The methylene chloride layer is added to methanol using a Waring blender. The precipitated polymer is filtered off and the polymer is washed with water until the water washings are no longer turbid. The polymer is washed with methanol using a Waring blender and then filtered off the polymer. The polymer is dried to constant weight in vacuo. The resulting polymer is 21% Br. This polymer is processed into fibers by extrusion with polyethyl-2-oxazoline. Specifically, 5 grams of PFCB is first blended in a Waring blender with 15 grams of 500,000 MW PeOX (a ratio of 1 to 3). The combined blend is added to a laboratory mixing extruder (Dynisco, LME) operated at 220° C. header and rotor temperatures with the drive motor operated at 50% of capacity, resulting in an extruded strand of the blend. This extruded strand is added to the blender to return it to granular form, and re-extruded two more times, creating a uniform extruded strand. During the final extrusion processes, the fibers are spun onto a take-up wheel (a Dynisco Take-Up System (TUS), at approximately 10 cm/second. The resulting extruded strand is repeatedly washed in water using a Waring blender, until the PeOX has been removed, resulting in a dispersion of PFCB nanofibers in water. The fibers are collected on a PTFE filter, and allowed to dry completely. Typically, the nanofibers are approximately 0.5 to 1 nm wide and more than 10 nm long.

Sulfonation of Brominated-PFCB Polymer Fibers. The brominated PFCB polymer fibers are allowed to react with potassium tetrafluoro-2-(tetrafluoro-2-iodoethoxy)ethanesulfonate (I-$CF_2CF_2OCF_2CF_2SO_3^-K^+$) with copper in dimethylsulfoxide (DMSO) by an Ullmann coupling reaction. All reagents are dried under vacuum at 60° C. before use. To a 3-neck, 250-mL flask, equipped with a reflux condenser, argon inlet, and mechanical stirrer and situated in an oil bath, is added brominated PFCB polymer (2 g, 21.1 wt. % bromine, made by adding 3.4 g of $Br_2$ to 5 g TRJ3058, PFCB-polymer, as described above), dimethyl sulfoxide (20 g, stored over 4 Å-molecular sieves). The mixture is heated in an oil bath set at 110° C., and the polymer dispersed but did not dissolve. While the stirred suspension is being heated in the oil bath at 110° C. under argon, copper powder (4.2 g, 45-micrometer particles, Acros 196575000) is rapidly added and the mixture is stirred for 2 hours. Potassium tetrafluoro-2-(tetrafluoro-2-iodoethoxy)ethanesulfonate (6.72 g) dissolved in DMSO (20 mL) was then added drop-wise (at a rate of one drop every 3 to six seconds). Stirring under argon in the 110° C. oil bath is continued for 18 hours. The mixture is allowed to settle at 23° C., and the solvent layer is pressure-filtered through a 5-micrometer Mitex® filter. The filtrate is added to 1 liter of 10% hydrochloric acid (prepared by adding 100-mL of concentrated HCl to 900-mL, deionized water) using a Waring blender. The mixture is stirred 16 hours at 23° C., and then the polymer is collected by filtration, washed extensively with water (3 liters) using a Waring blender, filtered and dried in vacuo. The yield is 3 g of sulfonated fibers with an ion exchange capacity of 1 meq H⁺/g.

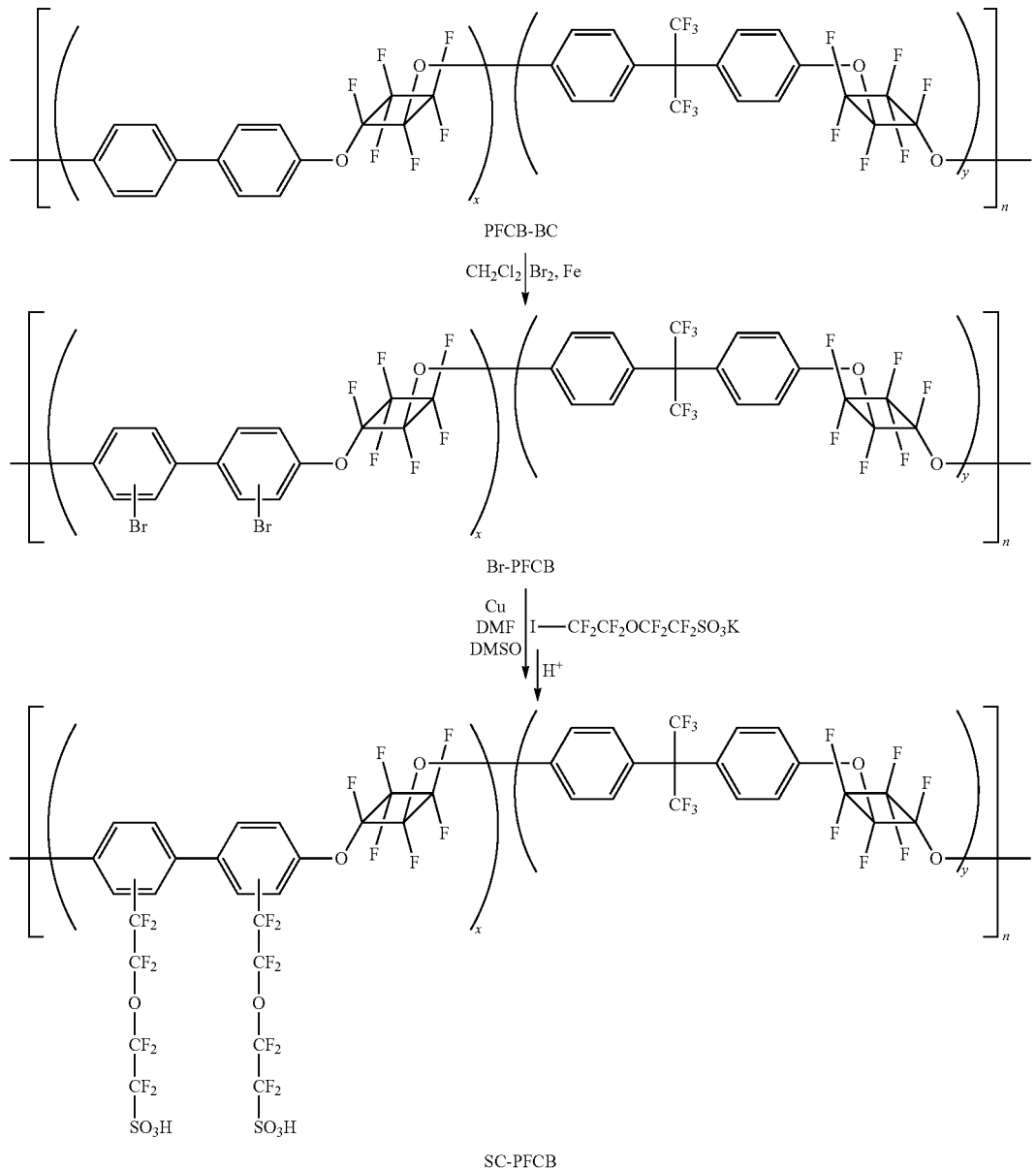

PFCB-BC

Br-PFCB

SC-PFCB

In this structure, molecular weights are typically between 50,000 and 150,000 (meaning n varies between 2 and 50 with about 5 being typical; x ranges between 5 and 60 with about 20 to 25 being preferred; and y is about ½ of x, i.e., y is between 2 and 30 with about 10 to 15 being preferred.

Sulfonated PFCB Fiber Reinforcement in Polyelectrolyte Membranes. Nafion® DE2020 (10 g of a 20 wt. % solution in 2:3 ratio of isopropanol in water, DuPont) is combined with sulfonated PFCB nanofibers (0.2 g) and the mixture is dispersed by sonication using a Misonix 3000 ultrasonic homogenizer for 5 minutes, set to pulse mode of 10 seconds on and 10 seconds off at 18 Watts. Membranes are cast by coating the ionomer-nanofiber dispersion onto Kapton-PTFE backer sheet (American Durofilm) situated on a vacuum platen of an Erichsen coater operated at 12.5 mm/sec using a 6-mil Bird applicator. The coated wet film and backer sheet are then heated to 80° C. on the platen, and then the film coating on backer is transferred to an oven and heated to 140° C. After 16 hours at 140° C., the coated film reinforced with nanofiber PFCB fiber is removed from the oven, released from the backer and used as polyelectrolyte membrane in a fuel cell.

Surface Platinum on PFCB Fibers. A catalytic layer is added to the sulfonated PFCB fibers. In the following example, platinum salt is reduced to metallic platinum on the surface of the perfluorocyclobutyl fibers. PFCB nanofibers (1 g), previously modified with the addition of sulfonic acid groups in 0.1 N sodium hydroxide (100 mL) are treated with diaminedinitroplatinum(II) as a 3.4 wt. % solution in dilute ammonium hydroxide [Aldrich, 47.4 mL solution, 48.42 g solution, 1.646 g diaminedinitroplatinum(II), 0.005126 mol diaminedinitroplatinum(II)]. To this mixture is added 100 mL of 15 wt. % sodium borohydride (Aldrich) in 0.1 N sodium hydroxide. After heating at 60° C. for 4 hours with stirring, the mixture is allowed to stir for 16 h at 23° C. The black nanofibers are isolated by filtration, washed with 1 N HCl, washed with isopropanol, and air dried. These metallized nanofibers are useful as fuel cell catalysts (and as electron conducting media in fuel cells).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A fuel cell comprising:
   a first flow field plate;
   a second flow field plate;
   a first catalyst-containing electrode layer interposed between the first flow field plate and the second flow field plate;
   a second catalyst-containing electrode layer interposed between the first flow field plate and the second flow field plate; and
   an ion-conducting layer interposed between the first catalyst-containing electrode layer and the second catalyst-containing electrode layer, wherein at least one of the first catalyst-containing electrode layer and the second catalyst-containing electrode layer includes sulfonated perfluorocyclobutyl-containing fibers, the sulfonated perfluorocyclobutyl-containing fibers including a catalyst, the sulfonated perfluorocyclobutyl-containing fibers are coated with a metal-containing layer.

2. The fuel cell of claim 1 wherein the perfluorocyclobutyl-containing fibers include a plurality of electrically conductive particles.

3. The fuel cell of claim 1 wherein the perfluorocyclobutyl-containing fibers have an average diameter from about 5 nanometers to about 10 microns.

4. The fuel cell of claim 1 wherein the first catalyst-containing electrode layer and the second catalyst-containing electrode layer each independently include a component selected from the group consisting of gold, platinum, palladium, and combinations thereof.

5. The fuel cell of claim 1 wherein the sulfonated perfluorocyclobutyl-containing fibers includes a plurality of electrically conductive particles.

6. The fuel cell of claim 2 wherein the electrically conductive particles are selected from the group consisting of carbon particles, graphite particles, metal particles, and combinations thereof.

7. The fuel cell of claim 1 wherein the catalyst includes platinum.

8. The fuel cell of claim 1 wherein the metal-containing layer includes a component selected from the group consisting of gold, palladium, platinum, and combinations thereof.

* * * * *